United States Patent [19]

Lawrence et al.

[11] Patent Number: 5,062,755
[45] Date of Patent: Nov. 5, 1991

[54] ARTICULATED ARM CONTROL

[75] Inventors: Peter D. Lawrence; Robert V. Ross, both of Vancouver, Canada

[73] Assignee: MacMillan Bloedel Limited

[21] Appl. No.: 384,912

[22] Filed: Jul. 25, 1989

Related U.S. Application Data

[63] Continuation of Ser. No. 158,731, Feb. 23, 1988, abandoned.

[51] Int. Cl.⁵ .................................................. B25J 3/00
[52] U.S. Cl. ............................................. 414/4; 901/20
[58] Field of Search ........................... 901/20, 7; 414/2

[56] References Cited

U.S. PATENT DOCUMENTS

| | | | |
|---|---|---|---|
| 3,589,134 | 6/1971 | Hackmann et al. | 901/15 X |
| 3,630,389 | 12/1971 | Schmidt et al. | 414/4 |
| 3,637,092 | 1/1972 | George et al. | 901/15 X |
| 3,909,600 | 9/1975 | Hohn | 364/513 |
| 4,252,213 | 2/1981 | Ekman | 182/2 |
| 4,493,219 | 1/1985 | Sharp et al. | 340/365 R X |
| 4,598,380 | 7/1986 | Holmes et al. | 318/568.18 X |
| 4,835,710 | 5/1989 | Schrdle et al. | 364/513 |

FOREIGN PATENT DOCUMENTS

| | | |
|---|---|---|
| 1060562 | 8/1979 | Canada . |
| 1203309 | 4/1986 | Canada . |
| 0113157 | 9/1979 | Japan ............ 414/4 |
| 2185593 | 7/1987 | United Kingdom ....... 414/4 |

OTHER PUBLICATIONS

Lofgren, Bjorn, "End-Point Control of a Folding Arm Crane", 09/29/86.
Wallersteiner et al., "A Human Factors Evaluation of Teleoperates Hand Controllers", Int'l Symposium on Teleoperation and Control, 07/15/88.
Deutsch, Stanley and Heer, Ewald, "Manipulator Systems Extend Man's Capabilities in Space", *Astronautics and Aeronautics*, Jun., 1972.

Primary Examiner—Robert J. Spar
Assistant Examiner—William M. Hienz

[57] ABSTRACT

A system for controlling x, y and z directional movement of a point adjacent to the free end of an arm composed of a plurality of interconnected articulated arm segments mounted for movement relative to at least three axes and providing for individual, independent control of movement of the point in any selected one of the x, y or z directions by controllably relatively adjusting the relationships between the segments. The system is particularly suitable for use in equipment when the arm incorporates a boom and stick such as backhoes or the like.

11 Claims, 4 Drawing Sheets

ARTICULATED ARM CONTROL

This application is a continuation of application Ser. No. 07/158,731, filed Feb. 23, 1988, now abandoned.

FIELD OF THE INVENTION

The present invention relates to joint control of an arm formed by articulated interconnected segments. More particularly the present invention relates to independent control of articulated arm segments for movement of a selected point adjacent to a free end of the arm independently in a selected one of the x, y or z directions.

BACKGROUND OF THE PRESENT INVENTION

Various types of coordinated controls have been proposed and used for controlling construction equipment such as backhoes (see Canadian Patent No. 1,060,562 issued Aug. 14, 1979 to Parquet et al) or for controlling the orientation of a hydraulic boom, for example, for positioning a rock drill for drilling (Canadian Patent No. 1,203,309 issued Apr. 15, 1986 to Saulters et al).

In the Parquet Canadian patent 1,060,562, there is described a system for automatically setting the position of an implement with respect to the frame by a combination of position sensors and activators.

Canadian Patent No. 1,203,309 to Saulters et al provides a system for maintaining the free end of an arm carrying a drill at a constant orientation when transferring the drill from one position to another, i.e. from one bore hole to another while maintaining the same angle to the horizontal. In the Saulters et al patent, the concept is to select a second position and then move the boom to the second position while maintaining the proper orientation.

Other devices of maintaining orientation of equipment are known, for example, in farm machinery devices are available for maintaining the orientation and space relationship of a mower and pick up system on a combine as shown for example in U.S. Pat. No. 4,518,044 issued May 21, 1985 to Wiegardt.

It is also well known to program equipment such as a robot to perform the same task repetitively by programming coordinates and having the articulated arms of the robot move between the designated points defined by such coordinates or to move on a designated trajectory between points.

Other control techniques have been applied to construction equipment see for example U.S. Pat. Nos. 3,339,763 and 3,414,146 which disclose hydraulic circuits that will function to automatically perform elected operations of a backhoe or U.S. Pat. No. 3,698,580 to Carlson which utilizes electric rather than hydraulic control to obtain similar operations.

BRIEF DESCRIPTION OF THE PRESENT INVENTION

It is an object of the present invention to provide a control system permitting independent control of movement of a free end of an arm composed of a plurality of articulated interconnected arm segments in a selected one of the x, y or z directions.

Broadly the present invention relates to a system for controlling movement of a point adjacent to the free end of an arm composed of a plurality of articulated interconnected arm segments mounted for movement on at least three axes at least one of which is a z axis thereby to move said point in any selected one of mutually perpendicular x, y, z directions, said x direction always being in a direction along a line extending from said point to said z axis, said y direction being movement around said z axis and z direction being substantially parallel to said z axis, comprising a control means, a computer means, means for independently moving said arm segments about each of said axes, said control means having discrete signal providing means for providing discrete signals to said computer for adjusting said x, said y or said z directions, said computer coordinating said means for independently moving of said arm segments about said axes to move said point substantially solely in said x direction if only said x signal is provided from said control means or solely in said y direction if only said y signal is provided from said control means or solely in said z direction if only said z signal is provided from said control means.

More particularly, the present invention relates to equipment incorporating a base adapted to pivot around a first axis, a boom (first arm segment) pivotally mounted on said base adjacent one end of said boom for movement on a second axis, said second axis being in a plane substantially perpendicular to said first axis, a stick (second arm segment) mounted on said boom adjacent the opposite end thereof from said one end for movement relative to said boom on a third axis, a manually operated controller having means for generating independent x, y or z control signals which control a point adjacent the end of said stick remote from said boom in mutually perpendicular x, y or z direction, said x direction always being movement in a direction along a line substantially radial of said z axis between said z axis and said point, said y direction is movement around said z axis and said z direction is movement parallel to said z axis, computer means coupled with said controller, individual actuator means for relatively moving the base, boom and stick on said first, second and third axes, said computer means actuating said individual actuator means to move said boom and stick relative to said second and third axis for movement of said point solely in the x direction or solely when said controller is manipulated to provide a signal solely for movement in the x direction or solely in said z direction respectively or relative to said first axis for movement of said point solely in the y direction when said controller is manipulated to provide a signal solely for movement in said y direction.

Preferrable said second and third axes will be substantially parallel.

The operators perspective relative to the point and the controller will be substantially constant by rotating the operator or his perspective by use of a camera so that movement of the control handle of said controller will result in a similar directional movement of said point relative to said operators perspective.

If desired further segments or elements may be articulated to said free end of said stick for movement relative to further axes and said controller will be provided with independent means for individually controlling a movement of said further segments or elements relative to said further axes.

BRIEF DESCRIPTION OF THE DRAWINGS

Further features, objects and advantages will be evident from the following detailed description of the preferred embodiments of the present invention taken in conjunction with the accompanying drawings, in which.

DESCRIPTION OF THE PREFERRED EMBODIMENTS

Figure 1:
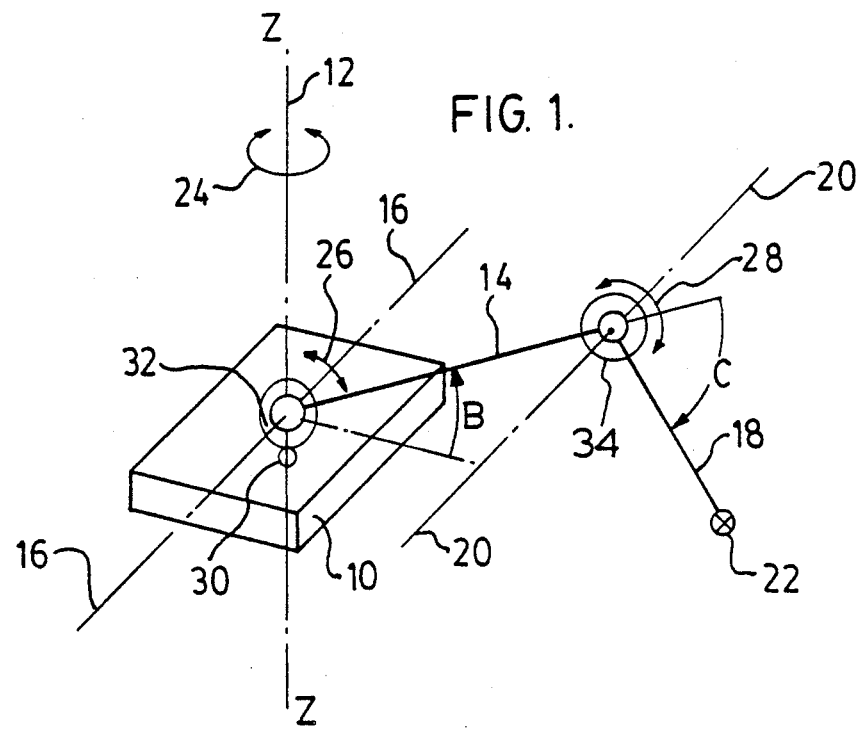
FIG. 1 is a schematic illustration of a pair of pivotably interconnected articulated arms.

FIG. 1 schematically illustrates by a simple line diagram an articulated arm arrangement that could comprise for example a backhoe having a base 10 mounted for rotation around a first axis 12 which in the illustrated arrangement is the z (vertical) axis. The base 10 has a first arm segment (boom) 14 mounted thereon for pivotal movement about an axis 16 that in a plane substantially perpendicular to the axis 12. A second arm segment (stick) 18 is pivoted to the end of the boom 14 for movement around an axis 20 substantially parallel to the axis 16. A reference point adjacent the free end of the stick 18 has been indicated at 22 by cross in a circle.

The base 10 is mounted on the frame (not shown) of the machine and is swung around the axis 12 relative to the frame of the machine by a suitable drive means as schematically illustrated by the arrow from 24; the boom 14 is pivoted around the axis 16 by a suitable drive means as schematically represented by the arrow 26; and similarly the stick 18 is pivoted on the axis 20 by a suitable drive means as indicated by the arrow 28. Angular displacement around the axis 12 defined herein as the z axis is measured by a suitable measuring or sensing device as indicated at 30. Similarly the angular displacement of the boom 14 about the axis 16 (angle B) is measured by the sensor 32 and the angular displacement of the stick 18 relative to the boom 14 (angle C) is measured by the sensor 34.

Figure 4:
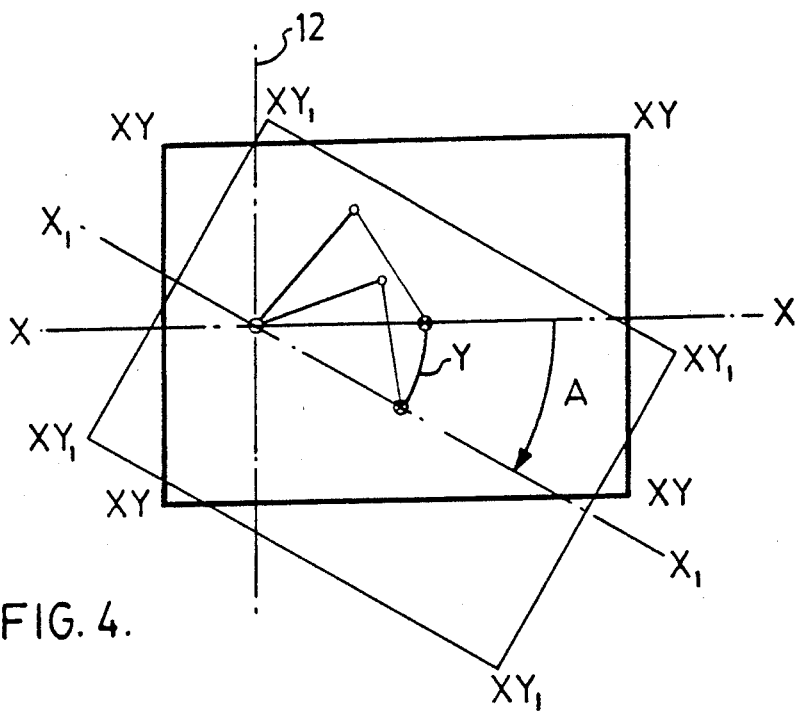
FIG. 4 is a schematic similar to FIG. 3 illustrating movement solely in the x—y plane in the y direction.

Angle A as shown in FIG. 4 is a measure of the angular displacement around the axis 12 (FIG. 4) relative to a set reference direction on the frame of the machine (normally fixed relative to the world but obviously moveable when the machine is relocated). Angle A is only required for remote control when the operator's perspective is not from on or adjacent to the z axis 12. Angle B defined as the angle between boom 14 and a plane perpendicular to the axis 12 (e.g. if axis 12 is vertical the angle of the longitudinal axis of the boom 14 to the horizontal) and the angle C is the angle between the longitudinal axis of the boom 14 and of the stick 18, i.e. angle at axis 20.

Figure 2:
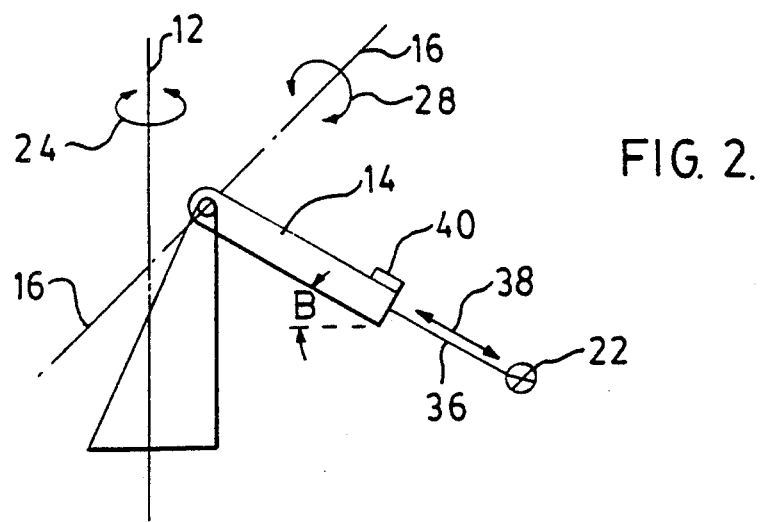
FIG. 2 is a schematic view similar to FIG. 1 illustrating a pair of arms interconnected for sliding movement.

In the arrangement shown in FIG. 2 the location of the pivotal axis 16 relative to the base 10 has been adjusted to position the axis higher in the z direction and the arm segment 18 has been replaced by a new arm segment 36 which instead of being pivoted to the free end of the arm segment 14 is slidable axially along the arm segment 14 by a suitable drive means as schematically illustrated by the arrow 38. The relative positions of the segments 14 and 36 of the FIG. 2 embodiment is detected by a suitable sensor 40.

It will be apparent that relative movements of the base 10, first arm segment (boom) 14 and second arm segment (stick) 18, 36 are all individually controlled and monitored in both the FIG. 1 and FIG. 2 embodiments.

The manner in which the arms 14 and 18, 36 are intended to be controlled when practicing the present invention will now be explained in relation to FIGS. 3, 4 and 5.

The invention will be described with reference to the x, y and z directions of movement of point 22 which directions are mutually perpendicular. The x direction for point 22, however, is always toward and away from the z axis, thus when the unit is rotated around the z axis, i.e. moved in the y direction as perceived by an operator whose perspective rotates with the base 10, the x direction is changed from the initial x—x direction to the selected $x_1$—$x_1$ direction (FIG. 4). This change in the x axis ensures that when an operator is operating from or has a perspective from the base 10 on or adjacent to the z axis movement directly to or away from the z axis (operator) is always the x direction. It will be apparent that if the arm segment 14 is pivotably mounted spaced slightly from the z axis as is normally the case the x direction will not be precisely toward the z axis but will actually be perpendicular to the axis of rotation of the arm 14 (axis 16) and in the line of the arms 14 and 18 (assuming they are aligned). This direction has been deemed for the purposes of the description essentially equivalent to movement of the point 22 along a line between point 22 and the z axis or in the x direction.

Figure 3:
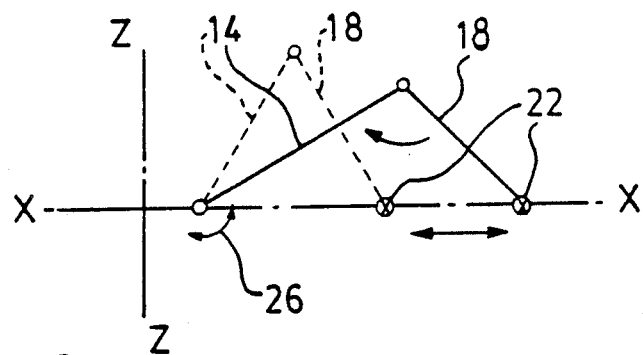
FIG. 3 is a schematic representation illustrating movement of a point adjacent to the free end of an arm solely in the x—z plane in the x direction.

Considering FIG. 3 if it is desired to move selected reference point 22 solely in the x direction as indicated by the line x—x in FIG. 3 relative to an operator whose perspective will be as if he were located on the base 10 on or adjacent to the axis 12, it is necessary to adjust angles B and C, i.e. to adjust the pivoting of the boom 14 around axis 16 and of the stick 18 around axis 20 (assuming the FIG. 1 embodiment). It will be apparent that by properly controlling the change of the angles it is possible to move the point 22 to travel solely along the line x—x.

Bearing in mind that the operator's perspective is always from a position on the base 10 on or adjacent to the z axis 12, rotation of the base 10 on axis 12 (movement in the y direction) will cause the x axis or x direction to change by the angle (angle A in FIG. 4) through which the base 10 is rotated, i.e. so that the line $x_1-x_1$ becomes the x direction. In other words, the x direction though changing relative to the land or outside environment by angle A in FIG. 4 does not change at all with respect to the operator when the point 22 is moved in the y direction.

If it is desired to move the selected point 22 solely in the y direction in a xy plane relative to the external environment (i.e. the direction substantially perpendicular to the x direction) as is indicated by the line y in FIG. 4, such movement may be accomplished by holding each of the angles B and C constant and by operating the drive or actuator 24 to rotate the base 10 around the axis 12. Obviously the movement of the base 10 will result in an arcuate movement of the point 22 along the plane xy in the y direction. Because x direction has been defined as always being substantially along the line between the point 22 and the z axis the arcuate movement around the axis 12 will redefine the x direction and therefore generate no movement in the x direction.

As indicated above the point 22 in moving along the line y in FIG. 4 moves in plane xy relative to the outside environment, however from the operator's perspective since his perspective will normally rotate with base 10 the x direction remains unchanged but is rotated as indicated by angle A relative to the world. The line $x_1-x_1$ still extends in the same direction relative to the operator (i.e. from the operator or z axis to point 22) but is now pointing in a different direction relative to the world as indicated by line $x_1-x_1$ and plane xy is now $xy_1$.

Figure 5:
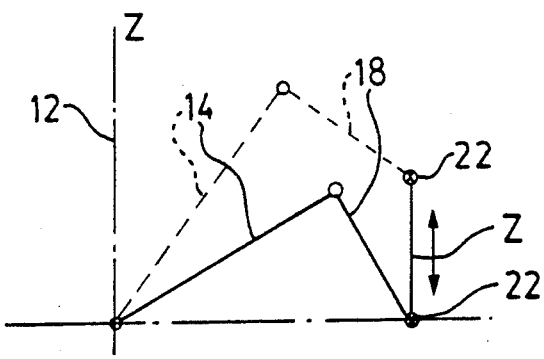
FIG. 5 is a schematic similar to FIG. 3 illustrating movement solely in the x—z plane in the z direction.

FIG. 5 shows movement along the z direction i.e. in a vertical plane. To accomplish this both the angles B and C must be adjusted simultaneously to hold the point 22 on the line z—z in FIG. 5.

It will be apparent if the FIG. 2 embodiment were used instead of an adjustment of the angle C a suitable adjustment of the length of the stick 32 will be made, i.e. the amount of the stick 36 projects from the boom 14 will be adjusted instead of adjustment of the angle C.

Figure 6:
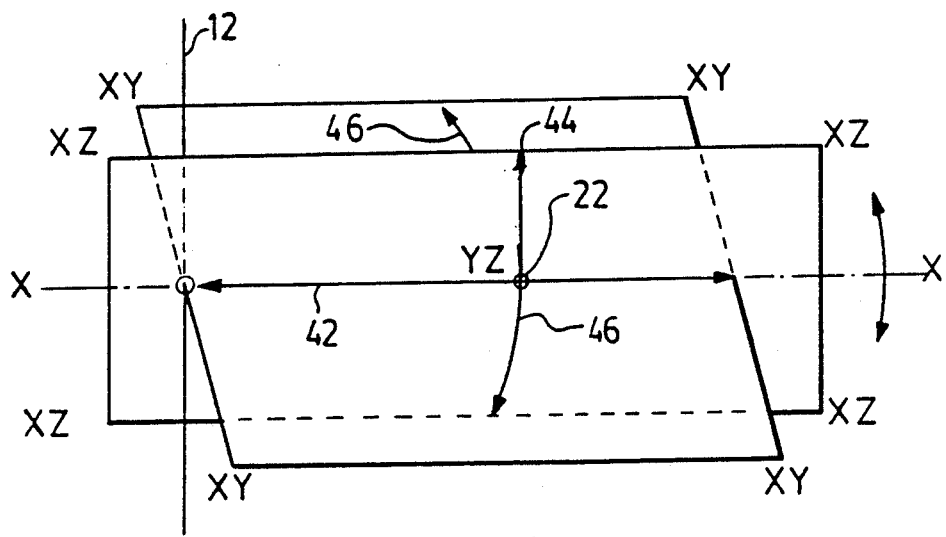
FIG. 6 is an isometric representation of the x—x and z—z planes illustrating movement of a point in the x, y or z directions.

The invention may be more clear from examination of FIG. 6 in which a vertical z plane xz—xz; and a horizontal y plane xy—xy are illustrated.

The present invention permits movement of the point 22 which in FIG. 6 has been illustrated as being a point on the xy and xz planes. The point 22 may selectively be moved for example along the line 42 (intersection of planes y and z) solely in the x direction (i.e. toward or away from the z axis) by properly adjusting the angles B and C or solely in vertical z direction, i.e. the illustrated xz plane as indicated by the line 44 or solely in the y direction along the arc 46 centered on axis 12. Movement in the y direction is relative to the earth, as above described, but not relative to the operator's perspective which is reoriented as the base 10 rotates so that the line x—x always remains essentially straight out from the operator the line between the point 22 and the z axis.

It is also possible to cause movement in all three directions simultaneously, i.e. the x, y and z directions to position the point 22 as will in many cases by used by simultaneously activating the controller (to be described below) to provide x, y and z direction signal.

Figure 7:
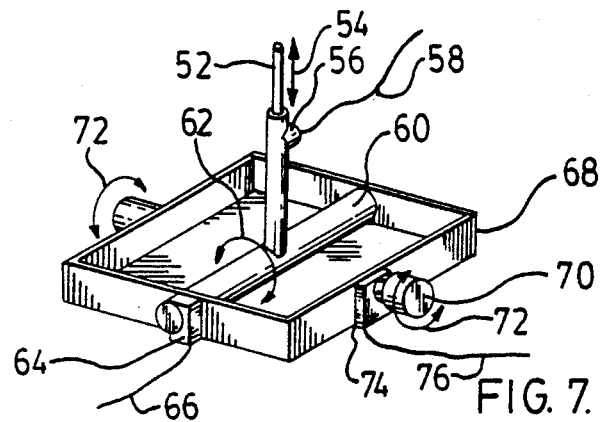
FIG. 7 is an isometric illustration of one type of joystick control which may be used with the present invention.

A simple manual controller that may be used in the present invention is illustrated in FIG. 7. The illustrated joystick 50 has a handle portion 52 moveable axially as indicated by the arrow 54 which movement is sensed by the sensor 56 and fed to the computer control (to be described below) by a communication line 58.

Movement of the handle portion 52 in a vertical z direction as indicated by the arrow 54 preferably will be used to generate a signals for controlling movement of point 22 solely in the z direction, i.e. the z direction control.

Handle 52 is mounted on a rocker shaft 60 that may be rocked right and left relative to an operator as indicated by the arrow 62 assuming the operator is so positioned relative to joy stick 50 as normally would be the case and as will be described below. This rocking is sensed by the sensor 64 and is transmitted to a computer control (to be described below) by a line 66. Such left right motion (y direction movement) preferably will be used to generate a signal controlling movement of point 22 solely in the y direction.

The rocker 60 is pivotally mounted in the frame 68 which in turn is rotatable on the axles 70 on an axis substantially perpendicular to the axis of rotation of the rocker 60 as indicated by the arrows 72. A suitable sensor 74 senses the angular displacement of the frame 68 and this information is fed to the computer control by a line 76. Movement around the axes 70 is in the fore and aft direction relative to the operator x direction and generates a signal to control movement of point 22 solely in the x direction.

The rocking motion (left right movement) applied to the rocker 60 will be used to control movement solely in the y direction, pivotal movement of the box frame 68 as indicated by the arrow 72 will cause movement of the point 22 substantially solely in the x direction and vertical movement of the handle 52 will cause movement of the point 22 solely in the z direction.

Figure 13:
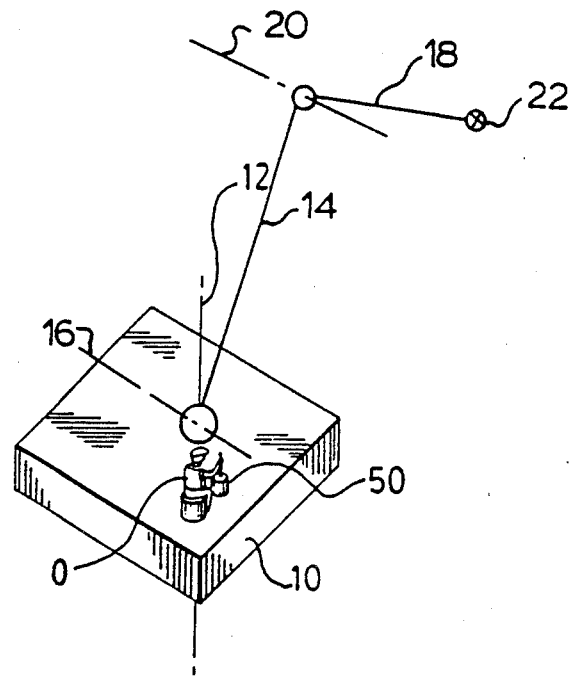
FIG. 13 illustrates the position of an operator relative to the controller and his view of the arm being controlled.

It is important to facilitate operation that the joystick 50 be positioned so that based on the operator's vision of the operation of the arm the direction of movement of the controller corresponds with the movement of the controlled point 22. For example if the joystick 50 is positioned in a cab on the base 10 it will be located relative to the operator 0 (FIG. 13) so that the operator 0 can look through the cab window and the movement in the x, y and z directions will be in the same frame of reference as he sees it looking through the wind shield. As above indicated the operator's perspective is constant with respect to the x direction and the joystick. Orientation of the joystick is constant with the operator so that x direction movement of the joystick is always substantially in line with the x direction of movement of point 22 from the operator's perspective.

Alternatively a camera not shown may be mounted on the base 10 in the appropriate location and the joystick 50 properly positioned relative to a monitor so that the image presented on the monitor will essentially be equivalent to what would be seen by an operator positioned on the base or platform 10.

The separate x, y and z direction control is also applicable and advantageous even if not aligned as above described with the operator's perspective.

The above description has been directed to equipment having three degrees of freedom. If used on a backhoe a suitable bucket may be positioned pivotally connected to the stick 18 or 36 in place of the point 22 as shown schematically at 78 in FIG. 10. The bucket 78 is illustrated as mounted to pivot on the axis 80 which is substantially parallel to the axis 16. A suitable sensor 82 detects the angle D between the stick 18 or 36 and a selected line on the bucket 78.

Figure 8:
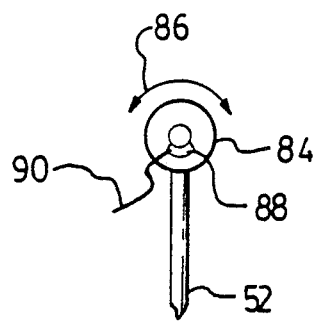
FIG. 8 shows a modification of control of FIG. 7 providing a further independent control.

When a bucket such as the bucket 78 or equivalent is applied to the free end of stick 18 or 36 a modified controller such as that shown in FIG. 8 may be provided. In this arrangement a knob in the form of the cylinder 84 is rotatably mounted at the top of the handle 52 for rotation as indicated by the arrow 86 on an axis substantially perpendicular to the z direction of movement of the handle 52 is on a y axis. A suitable sensor 88 senses the angular displacement of the knob 84 and feeds this information by a line 90 to the computer control and used to control the attitude of the bucket 78 preferrably to axis 12.

Figure 9:
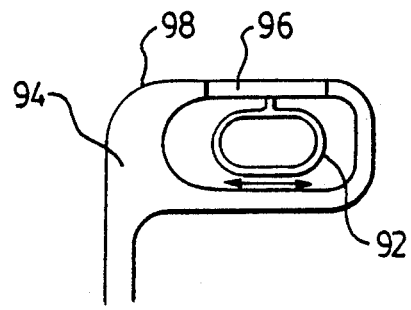
FIG. 9 shows an alternative further independent control to that shown in FIG. 8.

In FIG. 9 an alternate system is shown wherein a trigger 92 is slidable (it could equally well be rotatably mounted) in a hand grip 94 mounted at the top handle 52. The position of the trigger 92 is monitored by a sensor 96 and this information fed to the computer control by a line such as the line 98 equivalent to line 90 in the FIG. 8 embodiment. The trigger 92 is an alternative to the knob 84 and may have essentially the same function.

Figure 12:
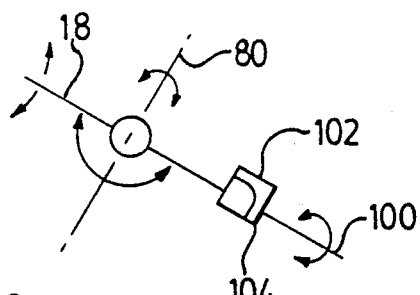
FIG. 12 illustrates a further degree of freedom that may be incorporated and controlled using the control of FIG. 11.

In FIG. 12 another degree of freedom is indicated by the axis 100 which is perpendicular to the axis 80. Angular displacement of the axis 100 is monitored by the sensor 102 and this information is fed to the computer by a line 104.

The further degree of freedom shown in FIG. 12 may be controlled for example by the arrangement shown in FIG. 9 which permits the hand grip 94 to swing around the axis which is illustrated as parallel to the z direction movement of the shaft 52 as indicated by the arrow 106. This swinging action may be monitored by a sensor 108 sensing the angular displacement of the handle 94 and this information sent to the computer control by the line 110.

If desired the handle grip 94 may replace the cylinder 84, i.e. grip 94 be mounted for movement around the axis perpendicular to the z direction movement of handle 52, i.e. y axis or if a further degree of freedom is desired a further axis may be provided preferrably on the z axis so that the grip 94 may pivot relative to the handle 52 on an axis parallel to the z direction of movement of handle 2 and/or on an axis perpendicular to the z direction of movement and these movements of the hand grip 94 used to control other degrees of freedom of an arm.

Figure 14:
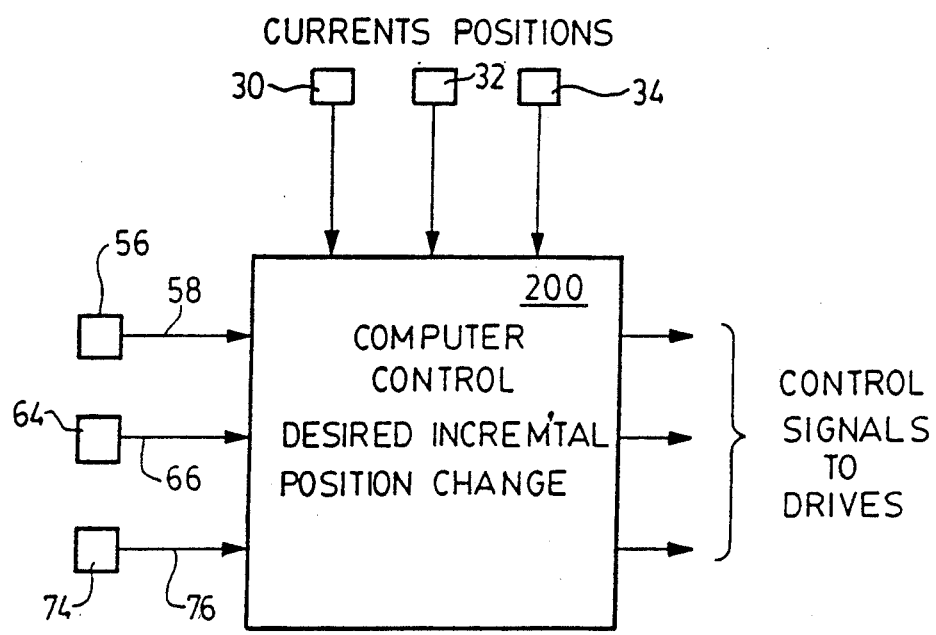
FIG. 14 is a schematic illustration of inputs and outputs to and from the computer control.

The computer control referred to above is illustrated at 200 in FIG. 14 has inputs from the sensors 56, 64 and 74 of controller 50 and further inputs (assuming the FIG. 1 embodiment) from the sensors 30, 32, and 34 which indicate the angular displacement on the axes 12, 16 and 20 respectively.

The changes signalled by the sensors 56, 64 and 74 are fed to the computer 200 which then signals the various operating mechanisms 24, 26 and 28 causing motion to adjust the angles A and B or to rotate around axis 12 accordingly.

The particular control strategy by which angles A and B and rotation around axis 12 are adjusted can be varied for example it might be a positional control however the preferred manner of control is based on a velocity control, velocity in any selected direction being set by the degree of displacement of the controller 50, i.e. of the x, y or z direction controls so that if one of the sensors 56, 64 or 74 is not sending a signal, i.e. that portion of the controller 50 is in neutral position no movement of the point 22 occurs in the direction controlled by that sensor. If desired the control function may be changed for different functions or locations of point 22, e.g. from velocity to positional control or vice versa depending on the task or position of point 22.

It is preferred that the controller be set to control the change in space of the point and not the angular change when rotating around the z axis so that for a given displacement of the control in the y direction the angular velocity is adjusted to compensate for the extension of the point 22 from the z axis, i.e. in the x direction.

Figure 10:
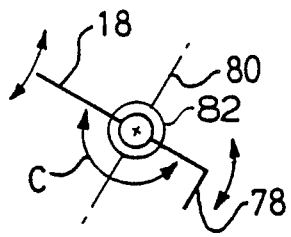
FIG. 10 is a schematic illustration of an added element that may be controlled with the controllers of FIGS. 8 and 9.
Figure 11:
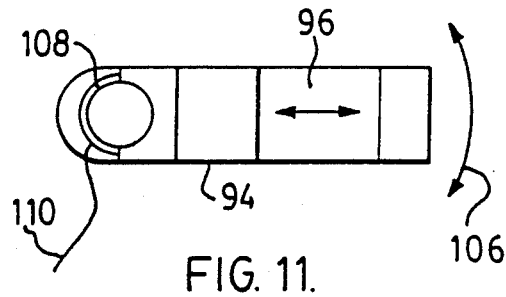
FIG. 11 illustrates a further modification of a controller of FIGS. 8 and 9 and adapted to control yet another degree of freedom.

When the system is used on for example a back hoe it may be desirable to hold the bucket at the free end of the arm 18, 36 at a particular orientation to the horizontal as the boom and stick are moved, this may also be easily accomplished by suitable control of the angle D (FIG. 10).

The computer control 200 preferably uses inverse kinematics to adjust the position of the arms 14, 18 (or 36) and base 10 in accordance with the input created by the manipulation of the controller 50.

The following is a description of the calculations of the various angles A, B and C referred to above wherein movement is from a first position designated by the subscript old. x is the coordinate in the x direction, z is the coordinate in the z direction and $\Delta x$, $\Delta y$, $\Delta z$ are increments in position requested by the operator at the present system clock time.

$$x = \Delta x + x_{old}$$

$$z = \Delta z + z_{old}$$

$$D = + \sqrt{x^2 + z^2}$$

$$A = \frac{\Delta y}{x} + A_{old}$$

$$B = \tan^{-1}\left(\frac{z}{x}\right) + \cos^{-1}\left[\frac{D^2 + LB^2 - LS^2}{2 \cdot D \cdot LB}\right]$$

$$C = \cos^{-1}\left[\frac{D^2 - LB^2 - LS^2}{2 \cdot LB \cdot LS}\right]$$

where
LB = length of boom 14 between axes 16 and 20
LS = length of stick 18 between axes 20 and point 22

It will be noted that to move in the y direction requires change in angle A and the new angle A is abovedefined as $$A = \frac{\Delta y}{x} + A_{old}.$$

The required change in angle A to obtain the commanded movement $\Delta y$ in a given time interval (velocity) varies dependent on the distance (x) from the end point 22 to the z axis. Dividing the commanded movement $\Delta y$ by the distance x adjusts the change in angle A so that the commanded change in y ($\Delta y$) is obtained and insures that the velocity of the end point 22 for a given command movement $\Delta y$ is independent of the distance between the end point 22 and the z axis.

Having described the invention modifications will be evident to those skilled in the art without departing from the spirit of the invention as described in the appended claims.

We claim:

1. A system for controlling the movement of an arm formed by a plurality of articulated interconnected arm segments mounted for movement on at least three separate axes one of which comprises a z axis to move a point located substantially adjacent to the free end of said arm selectively in substantially mutually perpendicular x, y and z directions, said x direction always being along a straight line extending substantially in the direction between said point and said z axis, said y direction being substantially along any selected arc of fixed radius around said z axis and said z direction being substantially parallel to said z axis, comprising a manually operated controller, a computer control means, independent means for moving said arm segments on each of said axes, said controller having x direction control means, y direction control means and z direction control means adapted to provide an independent x, y and z signal respectively to said computer control means, each said signal varying in accordance with displacement of its respective direction control means, said computer control means controlling said means to move said arm segments to move said point in solely a selected one of said x, y or z directions when said controller is activated to provide a signal to said computer control means for movement in solely the selected one of said x, y or z directions, respectively, said computer control means controlling said means to move said arm segments to move said point in said y direction at the same velocity for a given displacement of said y direction control means regardless of the position of said point relative to said z axis, said controller being positioned so that the direction of displacement of at least two of said independent x, y and z direction control means is manipulated substantially in the same respective x, y or z direction as the direction of movement of said point from the perspective of an operator operating said controller.

2. A system as defined in claim 1 wherein an operator's position and said controller are in fixed relationship with respect to the x direction of movement of said point.

3. A system as defined in claim 2 wherein said second arm segment is mounted for movement relative to said first arm segment about said third axis.

4. A system as defined in claim 1 wherein said second arm segment is mounted for movement relative to said first arm segment about said third axis.

5. A system as defined in claim 1 wherein said controller includes a joy stick that provides each of said x, y and z signals when moved respectively in said x, y or z directions of movement of said point.

6. A system for controlling the operation of equipment comprising, a base rotatable around a first axis by a first actuator means, a first arm segment pivotably mounted on a said base for pivotal movement about a second axis by a second actuator means, said second axis being in a plane substantially perpendicular to said first axis, a second arm segment mounted at the end of said first arm segment remote from said base, said second arm segment being mounted on said first arm segment for movement relative to said first arm segment on a third axis by a third actuator means, a manually operated controller having discrete signal generating means for generating discrete signals for x, y or z direction movements respectively of a point located on said second arm segment adjacent to the end of said second arm segment remote from said first arm segment, said discrete signal varying in accordance with displacement of their respective said signal generating means, a computer control means receiving said x, y or z signals from said controller, said computer control means activating said first, second and third actuator means in accordance with said signals for x, y or z direction movements received from said controller, said computer control means controlling said actuator means to move said point in said x, y or z directions and at a velocity having its component in said x, y and z direction directly dependent on the x, y or z signals respectively so that velocity in said y direction is the same for a given displacement of said signal generating means in said y direction regardless of the position of said point relative to said z axis, said x direction always being along a straight line extending substantially in the direction between said point and said first axis, said y direction being substantially along any selected arc of fixed radius around said first axis and said z direction being substantially parallel to said first axis said controller being positioned relative to an operator and said operator's perspective of said arm such that manual movement of said signal generating means of said controller in substantially at least two of said x, y and z directions of movement of said point generates x, y or z signals to cause said point to move in said at least two x, and y or z directions respectively relative to said operator's perspective.

7. A system as defined in claim 6 wherein a operator's position and said controller are in fixed relationship with respect to the x direction of movement of said point.

8. A system as defined in claim 7 where said controller rotates with said base.

9. A system as defined in claim 7 wherein said second arm segment is mounted for movement relative to said first arm segment about said third axis.

10. A system as defined in claim 6 wherein said second arm segment is mounted for movement relative to said first arm segment about said third axis.

11. A system as defined in claim 6 wherein said controller includes a joy stick that provides each of said x, y and signals when moved respectively in said x, y or z directions of movement of said point.

* * * * *